(12) United States Patent
Tanaka (10) Patent No.: US 11,787,435 B2
(45) Date of Patent: Oct. 17, 2023

(54) VEHICLE CONTROL DEVICE

(71) Applicant: TOYOTA JIDOSHA KABUSHIKI KAISHA, Toyota (JP)

(72) Inventor: Yusuke Tanaka, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 269 days.

(21) Appl. No.: 17/308,644

(22) Filed: May 5, 2021

(65) Prior Publication Data

US 2021/0394773 A1    Dec. 23, 2021

(30) Foreign Application Priority Data

Jun. 19, 2020 (JP) ................. 2020-106333

(51) Int. Cl.
*B60W 50/12* (2012.01)
*B60W 40/09* (2012.01)

(52) U.S. Cl.
CPC ............ *B60W 50/12* (2013.01); *B60W 40/09* (2013.01); *B60W 2540/10* (2013.01); *B60W 2540/221* (2020.02); *B60W 2540/229* (2020.02)

(58) Field of Classification Search
CPC ........... B60W 10/18; B60W 30/18027; B60W 30/18054; B60W 40/09; B60W 40/10; B60W 50/0098; B60W 50/10; B60W 50/12; B60W 2040/0818; B60W 2520/10; B60W 2540/10; B60W 2540/103; B60W 2540/12; B60W 2540/18; B60W 2540/221; B60W 2540/229
See application file for complete search history.

(56) References Cited

U.S. PATENT DOCUMENTS

| | | |
|---|---|---|
| 2005/0270145 A1 | 12/2005 | Kataoka et al. |
| 2006/0025918 A1 | 2/2006 | Saeki |
| 2010/0100278 A1* | 4/2010 | Saito .................. B60T 7/12 701/29.2 |
| 2013/0162794 A1 | 6/2013 | Wakiyama |
| 2018/0037112 A1* | 2/2018 | Otake ................ F16D 65/186 |
| 2018/0037215 A1* | 2/2018 | Otake ............ B60W 30/18054 |
| 2018/0037235 A1* | 2/2018 | Otake ............... B60W 30/12 |

FOREIGN PATENT DOCUMENTS

| | | |
|---|---|---|
| JP | 2006-315491 A | 11/2006 |
| JP | 2008-195402 A | 8/2008 |
| JP | 4172434 B2 | 10/2008 |
| JP | 2009-190464 A | 8/2009 |
| JP | 4349210 B2 | 10/2009 |

(Continued)

*Primary Examiner* — Peter D Nolan
*Assistant Examiner* — Ce Li Li
(74) *Attorney, Agent, or Firm* — Sughrue Mion, PLLC (57) ABSTRACT

When a driver is in an abnormal state, a vehicle control device executes a stop control of applying a braking force to a vehicle to stop the vehicle and a stop holding control of holding the vehicle in a stopped state after stopping the vehicle with the stop control. The control device is configured to prohibit the stop holding control from being released, when a first condition that is satisfied when an operation amount of an accelerator operator is larger than a predetermined threshold value is satisfied, while the stop holding control is being executed.

2 Claims, 9 Drawing Sheets

(56) References Cited

FOREIGN PATENT DOCUMENTS

| | | | |
|---|---|---|---|
| JP | 2010-006279 | A | 1/2010 |
| JP | 2013-152700 | A | 8/2013 |
| JP | 2014024368 | A * | 2/2014 |
| JP | 2014-148293 | A | 8/2014 |
| JP | 2018-24288 | A | 2/2018 |
| JP | 2019-023831 | A | 2/2019 |
| JP | 2019-182012 | A | 10/2019 |

* cited by examiner

VEHICLE CONTROL DEVICE

CROSS-REFERENCE TO RELATED APPLICATION

This application claims priority to Japanese Patent Application No. 2020-106333 filed on Jun. 19, 2020, incorporated herein by reference in its entirety.

BACKGROUND

1. Technical Field

The present disclosure relates to a vehicle control device configured to stop a vehicle when it is determined that a driver is in an abnormal state.

2. Description of Related Art

Conventionally, a device for forcibly stopping a vehicle (hereinafter referred to as a "conventional device") when it is determined that a driver is in an abnormal state has been proposed (for example, see Japanese Unexamined Patent Application Publication No. 2019-023831 (JP 2019-023831 A)). Here, the abnormal state means a state in which the driver has lost the ability to drive a vehicle, and includes, for example, a dozing driving state and a mental and physical dysfunction state.

One of the conventional devices executes a stop holding control for holding the vehicle in a stopped state after the vehicle is stopped. Further, when the driver operates an operator (for example, an accelerator pedal) for driving the vehicle while the stop holding control is being executed, the conventional device determines that the driver's state has returned from the abnormal state to the normal state, and releases the stop holding control.

SUMMARY

By the way, a rescuer may rescue a driver while a stop holding control is being executed. At that time, for example, the driver's foot may touch the accelerator pedal. In this case, the conventional device releases the stop holding control. Thus, in the conventional device, there is a possibility that the vehicle will start even though the driver is being rescued.

The present disclosure has been made to solve the above problems. That is, one object of the present disclosure is to provide a vehicle control device capable of reducing the possibility of a vehicle starting while a driver is being rescued.

A vehicle control device of the present disclosure includes: a sensor (11) that acquires information about an operation amount of a driving operator operated by a driver of a vehicle to drive the vehicle, the driving operator at least including an accelerator operator (11a) operated to accelerate the vehicle; and a control device (10) that is configured to repeatedly determine whether the driver is in an abnormal state in which the driver has lost an ability to drive the vehicle while the vehicle is traveling, based on the information about the operation amount of the driving operator, execute a stop control of applying a braking force to the vehicle to stop the vehicle, when a determination that the driver is in the abnormal state is continued (step 505, 604), and execute a stop holding control of holding the vehicle in a stopped state by continuously applying the braking force to the vehicle (step 701: Yes, step 702) after the vehicle is stopped by the stop control (step 603: No). The control device is configured to prohibit the stop holding control from being released, when a first condition that is satisfied when the operation amount of the accelerator operator is larger than a predetermined threshold value is satisfied (step 705: Yes), while the stop holding control is being executed.

According to the above configuration, when the first condition is satisfied, the stop holding control is prohibited from being released. Thus, it is possible to prevent a vehicle from starting, even when the driver's foot touches the accelerator operator when a rescuer rescues the driver.

In one aspect of the present disclosure, the control device is configured to prohibit the stop holding control from being released, when a second condition that is satisfied when a probability that the driver is currently being rescued is high is satisfied (step 901: Yes), in addition to the first condition (step 705: Yes), while executing the stop holding control.

According to the above configuration, the stop holding control is prohibited from being released when a probability that the driver is being rescued is high.

In one aspect of the present disclosure, the control device is configured to release the stop holding control (step 707), when the second condition is not satisfied and a predetermined release operation for releasing the stop holding control is performed (step 901: No and step 706: Yes), even when the first condition is satisfied while the stop holding control is being executed (step 705: Yes).

When the second condition is not satisfied, there is a possibility that the state of the driver has returned from the abnormal state to a normal state, and the driver is touching the accelerator operator in order to immediately resume the traveling of the vehicle. According to the above configuration, even if the driver is touching the accelerator operator, when the second condition is not satisfied, the driver can release the stop holding control by performing the release operation. Thus, it is possible to reflect the driver's intention to restart driving.

In one aspect of the present disclosure, the control device is configured to determine that the second condition is satisfied, when at least one of a condition that a door corresponding to a seat of the driver is open and a condition that a seat belt of the seat of the driver is in a released state is satisfied.

According to the above configuration, it is possible to determine whether a probability that the driver is being rescued is high according to the state of the door corresponding to the seat of the driver and/or the seat belt of the seat of the driver.

In one or more embodiments, the control device described above may be implemented by a microprocessor programmed to execute one or more of the functions described herein. In one or more embodiments, the control device may be implemented in whole or in part by an integrated circuit specialized for one or more applications, that is, a hardware configured by an ASIC or the like. In the above description, in order to help the understanding of the present disclosure, the names and/or symbols used in the embodiments are added in parentheses, in the configurations of the disclosure corresponding to the embodiments described below. However, each component of the present disclosure is not limited to the embodiments defined by the above name and/or symbol.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Figure 1:
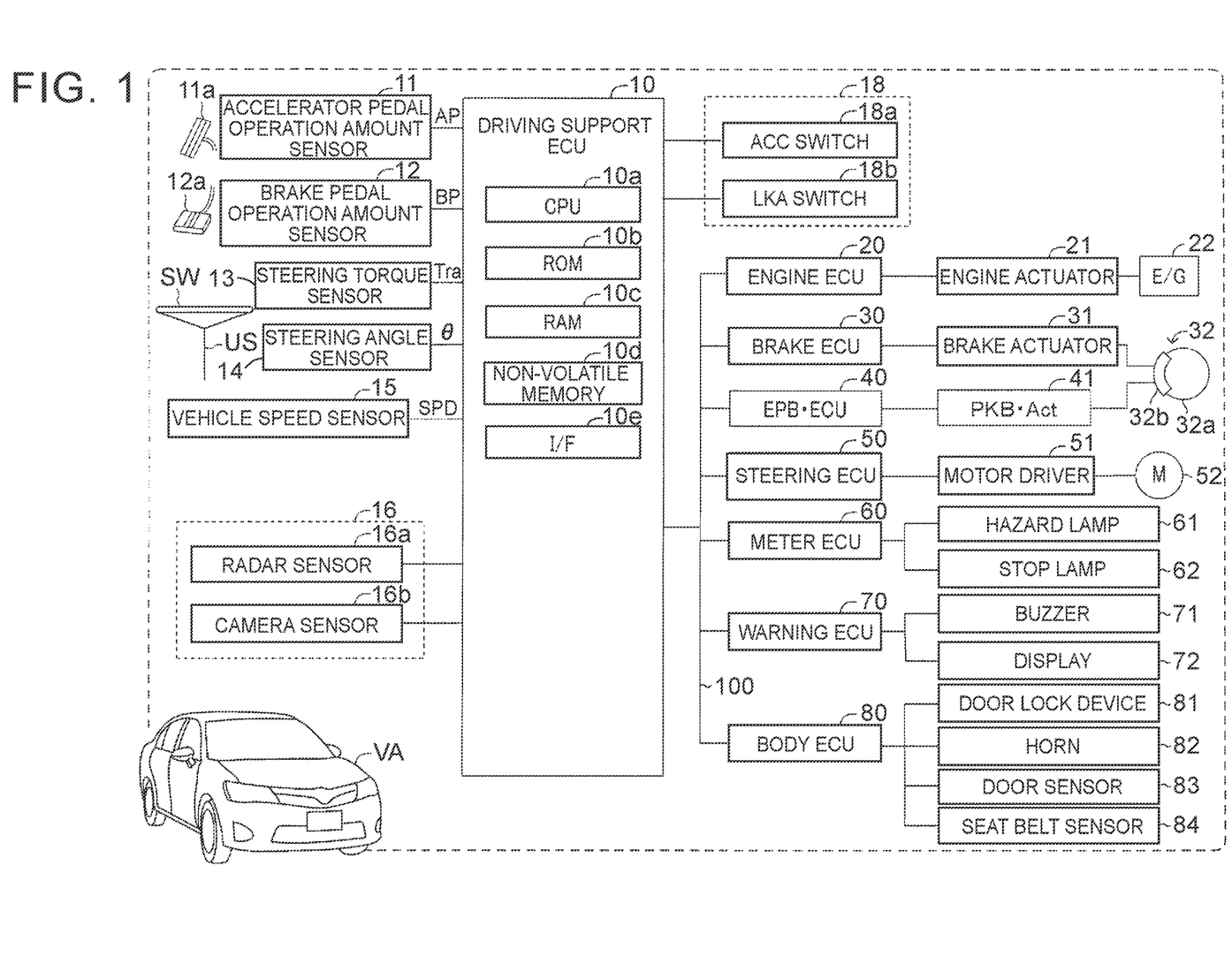
FIG. 1 is a schematic configuration diagram of a vehicle control device (first device) according to a first embodiment.

A vehicle control device according to a first embodiment (hereinafter, may be referred to as a "first device") is applied to a vehicle VA as shown in FIG. 1. The vehicle control device includes a driving support ECU 10, an engine ECU 20, a brake ECU 30, an electric parking brake ECU (hereinafter, referred to as an "EPB-ECU") 40, a steering ECU 50, a meter ECU 60, a warning ECU 70, and a body ECU 80.

These ECUs are electric control units including a microcomputer as a main unit, and are connected to each other via a controller area network (CAN) 100 so that information can be transmitted and received. Some or all of the ECUs 10 to 80 may be integrated into one ECU.

In the present specification, a microcomputer includes a CPU, a ROM, a RAM, a non-volatile memory, an interface (I/F), and the like. The CPU realizes various functions by executing instructions (programs and routines) stored in ROM. For example, the driving support ECU 10 includes a microcomputer including a CPU 10a, a ROM 10b, a RAM 10c, a non-volatile memory 10d, an interface (I/F) 10e, and the like.

The driving support ECU 10 is connected to sensors and switches described later, and receives detection signals or output signals thereof.

The accelerator pedal operation amount sensor 11 detects an operation amount AP of an accelerator pedal (accelerator operator) 11a, and outputs a signal representing the accelerator pedal operation amount AP. When the driver is not operating the accelerator pedal 11a, the accelerator pedal operation amount AP becomes "0". The greater the amount by which the driver depresses the accelerator pedal 11a, the greater the accelerator pedal operation amount AP.

A brake pedal operation amount sensor 12 detects an operation amount BP of a brake pedal (brake operator) 12a and outputs a signal indicating the brake pedal operation amount BP. When the driver is not operating the brake pedal 12a, the brake pedal operation amount BP becomes "0". The greater the amount by which the driver depresses the brake pedal 12a, the greater the amount of brake pedal operation BP.

A steering torque sensor 13 detects a steering torque Tra acting on a steering shaft US by a driver's operation of a steering wheel SW (steering operation), and outputs a signal representing the steering torque Tra. When the driver is not operating the steering wheel SW, the steering torque Tra becomes "0". Further, the value of the steering torque Tra becomes a positive value when the steering wheel SW is rotated in a first direction (left direction), and becomes a negative value when the steering wheel SW is rotated in a second direction (right direction). A steering angle sensor 14 detects a steering angle θ of the vehicle VA and outputs a signal representing the steering angle θ. A vehicle speed sensor 15 detects a traveling speed (hereinafter, referred to as a "vehicle speed") SPD of the vehicle VA, and outputs a signal representing the vehicle speed SPD.

Hereinafter, the accelerator pedal 11a, the brake pedal 12a, and the steering wheel SW may be collectively referred to as "driving operators" because they are operators operated by the driver to drive the vehicle VA.

A surrounding sensor 16 is a sensor that detects the surrounding condition of the vehicle VA. The surrounding sensor 16 acquires information on a road around the vehicle VA (for example, a traveling lane in which the vehicle VA is traveling) and information on a three-dimensional object existing on the road. A three-dimensional object includes, for example, moving objects such as pedestrians, four-wheeled vehicles and two-wheeled vehicles, and fixed objects such as guardrails and fences. Hereinafter, these three-dimensional objects may be referred to as "target objects". The surrounding sensor 16 includes a radar sensor 16a and a camera sensor 16b.

The radar sensor 16a radiates, for example, a radio wave of a millimeter wave band (hereinafter, referred to as a "millimeter wave") to a peripheral region of the vehicle VA, and the millimeter wave reflected by a target object existing within the radiation range (that is, a reflected wave) is received. The radar sensor 16a determines the presence or absence of the target object and calculates information indicating the relative relationship between the vehicle VA and the target object. The information indicating the relative relationship between the vehicle and the target object includes the distance between the vehicle VA and the target object, the direction (or position) of the target object with respect to the vehicle VA, the relative speed of the target object with respect to the vehicle VA, and the like. The information obtained from the radar sensor 16a (including information indicating the relative relationship between the vehicle VA and the target object) is referred to as "target object information".

The camera sensor 16b captures the scenery in front of the vehicle VA and acquires image data. Based on the image data, the camera sensor 16b recognizes a plurality of division lines (for example, a left white line and a right white line) that define a traveling lane in which the vehicle VA is traveling. Further, the camera sensor 16b calculates a parameter (for example, a curvature) indicating the shape of the traveling lane, a parameter indicating the positional relationship between the vehicle VA and the traveling lane, and the like. The parameter indicating the positional relationship between the vehicle VA and the traveling lane includes, for example, the distance between the center position of the vehicle VA in the vehicle width direction and an arbitrary position on the left white line or the right white line. The information acquired by the camera sensor 16b is called "lane information". The camera sensor 16*b* may be configured to determine the presence or absence of the target object and calculate the target object information based on the image data.

The surrounding sensor 16 outputs information on the surrounding conditions of the vehicle including "the target object information and the lane information" to the driving support ECU 10 as "vehicle peripheral information".

An operation switch 18 is provided on the steering wheel SW, and includes various switches operated by the driver when starting/ending the driving support control. The driving support control includes a follow-up inter-vehicle distance control and a lane keeping control.

The follow-up inter-vehicle distance control is well known (see, for example, Japanese Unexamined Patent Application Publication No. 2014-148293 (JP 2014-148293 A), Japanese Unexamined Patent Application Publication No. 2006-315491 (JP 2006-315491 A), and Japanese Patent No. 4172434 (JP 4172434 B), etc.) and may be referred to as an "adaptive cruise control". Hereinafter, the follow-up inter-vehicle distance control is simply referred to as the "ACC".

The lane keeping control is well known (see, for example, Japanese Unexamined Patent Application Publication No. 2008-195402 (JP 2008-195402 A), Japanese Unexamined Patent Application Publication No. 2009-190464 (JP 2009-190464 A), Japanese Unexamined Patent Application Publication No. 2010-6279 (JP 2010-6279 A), and Japanese Patent No. 4349210 (JP 4349210 B), etc.), and may be referred to as a "lane keeping assist" or a "lane tracing assist". Hereinafter, a lane keeping control will be simply referred to as "LKA".

The operation switch 18 includes an ACC switch 18*a* and an LKA switch 18*b*. The ACC switch 18*a* is a switch operated by the driver when starting/ending ACC. The LKA switch 18*b* is a switch operated by the driver when starting/ending LKA.

Further, the engine ECU 20 is connected to an engine actuator 21. The engine actuator 21 includes a throttle valve actuator that changes an opening degree of a throttle valve of an internal combustion engine 22. The engine ECU 20 can change the torque generated by the internal combustion engine 22 by driving the engine actuator 21. The torque generated by the internal combustion engine 22 is transmitted to drive wheels via a transmission (not shown). Thus, the engine ECU 20 can control the driving force of the vehicle VA and change the acceleration state (acceleration) by controlling the engine actuator 21.

When the vehicle VA is a hybrid vehicle, the engine ECU 20 can control the driving force generated by either or both of "an internal combustion engine and an electric motor" serving as a vehicle driving source. Further, when the vehicle VA is an electric vehicle, the engine ECU 20 can control the driving force generated by the electric motor serving as the vehicle driving source.

The brake ECU 30 is connected to a brake actuator 31. The brake actuator 31 is an actuator that controls a friction brake mechanism 32, and includes a known hydraulic circuit. The friction brake mechanism 32 includes a brake disc 32*a* fixed to a wheel and a brake caliper 32*b* fixed to a vehicle body. The brake actuator 31 adjusts the hydraulic pressure supplied to a wheel cylinder built in the brake caliper 32*b* in accordance with an instruction from the brake ECU 30, and presses a brake pad against the brake disc 32*a* with a hydraulic pressure to generate a friction braking force. Thus, the brake ECU 30 can control the braking force of the vehicle VA and change the acceleration state (deceleration, that is, negative acceleration) by controlling the brake actuator 31.

The EPB-ECU 40 is connected to a parking brake actuator (hereinafter, referred to as a "PKB-actuator") 41. The PKB-actuator 41 presses the brake pad against the brake disc 32*a*, or, if equipped with a drum brake, presses a shoe against a drum that rotates with the wheels to generate frictional braking force. Thus, the EPB-ECU 40 can apply a parking brake force to the wheels by using the PKB-actuator 41 to keep the vehicle in a stopped state. Hereinafter, braking of the vehicle VA caused by operating the PKB-actuator 41 is simply referred to as an "EPB".

The steering ECU 50 is a well-known control device for an electric power steering system, and is connected to a motor driver 51. The motor driver 51 is connected to a steering motor 52. The motor 52 is incorporated in a steering mechanism of the vehicle VA (including the steering wheel SW, the steering shaft US, a steering gear mechanism, and the like). The motor 52 generates torque by electric power supplied from the motor driver 51, and the steering assist torque can be applied or the left and right steered wheels can be steered by this torque.

The meter ECU 60 is connected to a digital display type meter (not shown) and is also connected to a hazard lamp 61 and a stop lamp 62. The meter ECU 60 can control the blinking of the hazard lamp 61 and the lighting of the stop lamp 62 in response to an instruction from the driving support ECU 10.

The warning ECU 70 is connected to a buzzer 71 and a display 72. The warning ECU 70 can sound the buzzer 71 to alert the driver or display an alert mark (warning lamp) on the display 72 in response to an instruction from the driving support ECU 10.

The body ECU 80 is connected to a door lock device 81, a horn 82, a door sensor 83, and a seat belt sensor 84. The body ECU 80 can control the door lock device 81 in accordance with an instruction from the driving support ECU 10 to lock or unlock the door of the vehicle VA. Further, the body ECU 80 can make the horn 82 ring in response to an instruction from the driving support ECU 10. The door sensor 83 outputs a signal indicating the state (either an open state or a closed state) of each door of the vehicle VA. The seat belt sensor 84 outputs a signal indicating a state (either a mounted state or a released state) of a seat belt of each seat of the vehicle VA.

Hereinafter, "the ACC and the LKA" executed by the driving support ECU 10 will be briefly described.

ACC

The ACC includes two types of control, which are a constant speed traveling control and a preceding vehicle following control. The constant speed traveling control is a control for making the vehicle VA travel so that a traveling speed of the vehicle VA matches a target speed (set speed) Vset without requiring the operation of the accelerator pedal 11*a* and the brake pedal 12*a*. The preceding vehicle following control is a control that makes the vehicle VA follow a following target vehicle while maintaining the inter-vehicle distance between a preceding vehicle (following target vehicle) and the vehicle VA at a target inter-vehicle distance Dset, without requiring the operation of the accelerator pedal 11*a* and the brake pedal 12*a*. The following target vehicle is a vehicle that is traveling in a front region of the vehicle VA and immediately in front of the vehicle VA.

When the ACC switch 18*a* is set to an ON state, the driving support ECU 10 determines whether there is the following target vehicle based on the target object information included in the vehicle peripheral information. When the driving support ECU 10 determines that there is no following target vehicle, the driving support ECU 10 executes the constant speed traveling control. The driving support ECU 10 controls the engine actuator 21 by using the engine ECU 20 to control the driving force so that the vehicle speed SPD matches the target speed Vset, and controls the brake actuator 31 by using the brake ECU 30 to control the braking force when necessary.

In contrast, when the driving support ECU 10 determines that there is the following target vehicle, the driving support ECU 10 executes the preceding vehicle following control. The driving support ECU 10 calculates the target inter-vehicle distance Dset by multiplying a target inter-vehicle time tw by the vehicle speed SPD. The target inter-vehicle time tw is set by using an inter-vehicle time switch (not shown). The driving support ECU 10 controls the engine actuator 21 by using the engine ECU 20 to control the driving force so that the inter-vehicle distance between the vehicle VA and the following target vehicle matches the target inter-vehicle distance Dset, and controls the brake actuator 31 by using the brake ECU 30 to control the braking force when necessary.

LKA

The LKA is a control (steering control) that changes a steered angle of steered wheels of the vehicle VA so that the vehicle VA travels along a target traveling line set by utilizing the lane markings. The operation support ECU 10 executes the LKA when the LKA switch 18b is set to the ON state while the ACC switch 18a is in the ON state.

Specifically, the driving support ECU 10 acquires information about "the left white line and the right white line" of the traveling lane in which the vehicle VA is traveling, based on the lane information included in the vehicle peripheral information. The driving support ECU 10 estimates the line connecting the center position in the width direction of the traveling lane between the left white line and the right white line as a "lane center line LM". The driving support ECU 10 sets the center line LM as a target traveling line TL.

The driving support ECU 10 calculates LKA control parameters required to execute the LKA. The LKA control parameters include a curvature CL of the target traveling line TL (=the reciprocal of a curvature radius R of the center line LM), a distance dL, a yaw angle θL, and the like. The distance dL is the distance between the target traveling line TL and the center position of the vehicle VA in the vehicle width direction (substantially in the road width direction). The yaw angle θL is the angle of a front-rear direction axis of the vehicle VA with respect to the target traveling line TL.

The driving support ECU 10 uses the LKA control parameters (CL, dL, θL) to calculate an automatic steering torque Trb for matching the position of the vehicle VA with the target traveling line TL in accordance with a known method. The automatic steering torque Trb is a torque applied to the steering mechanism by driving the motor 52 without the driver operating the steering wheel SW. The driving support ECU 10 controls the motor 52 via the motor driver 51 so that the actual torque applied to the steering mechanism matches the automatic steering torque Trb. That is, the driving support ECU 10 executes a steering control.

Overview of Operation

The driving support ECU 10 determines repeatedly whether the driver is in an "abnormal state in which they have lost the ability to drive the vehicle (hereinafter, simply referred to as an "abnormal state")" when the ACC and the LKA are being executed. As described above, the abnormal state includes, for example, a dozing driving state, a mental and physical dysfunction state, and the like. The driving support ECU 10 executes a vehicle control in accordance with a plurality of driving modes when it is continuously determined that the driver is in an abnormal state. Hereinafter, the control of these plurality of operation modes will be described with reference to FIG. 2.

Normal Mode

Figure 2:
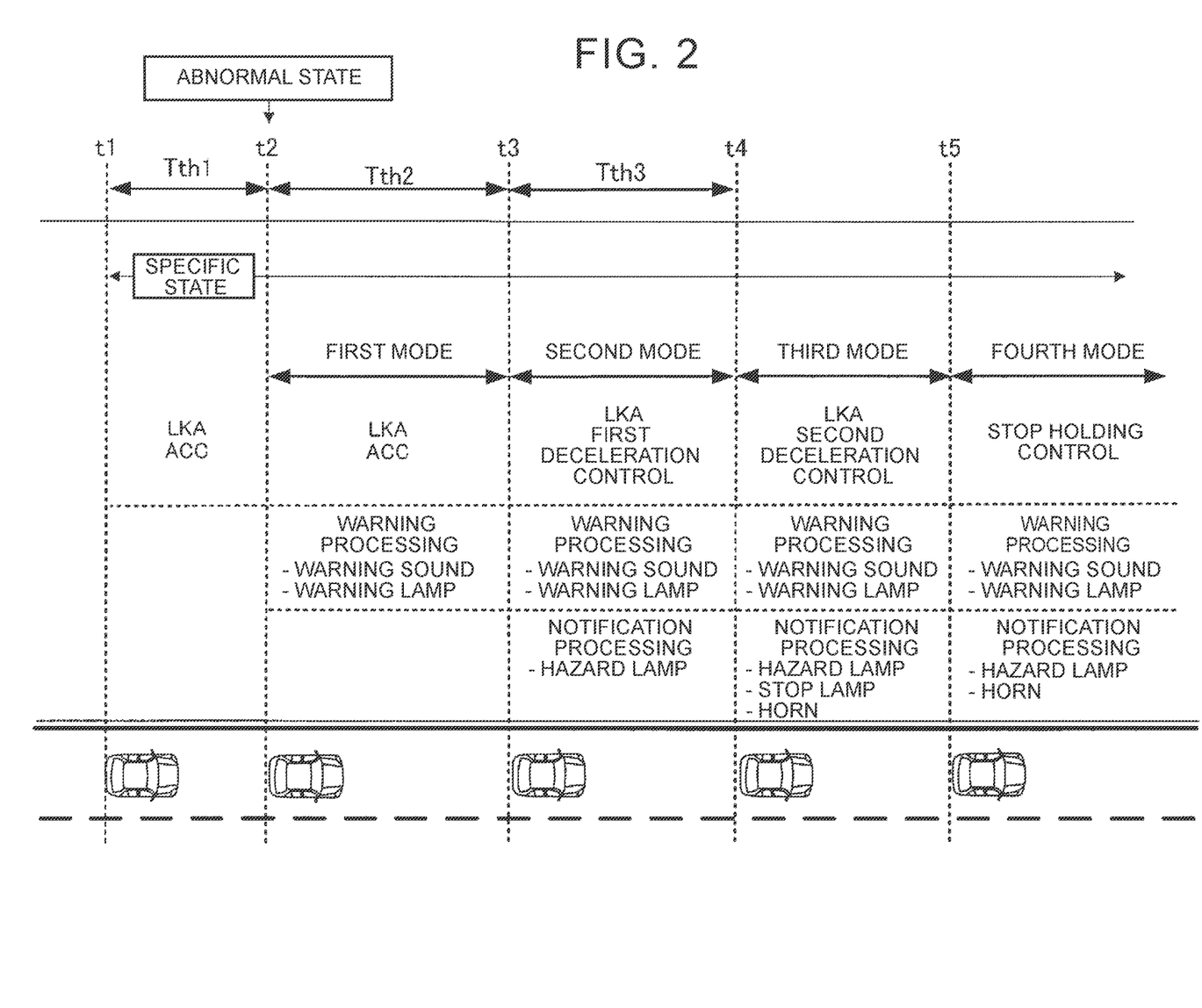
FIG. 2 is a diagram for describing an operation of the vehicle control device shown in FIG. 1.

In the example shown in FIG. 2, both the ACC and the LKA are normally executed before a time point t1. At the time point t1, the driving support ECU 10 detects that the driver is not operating the driving operator. Hereinafter, such a state will be referred to as a "specific state (or no operation state)". The specific state is a state in which none of the parameters consisting of one or more combinations of "the accelerator pedal operation amount AP, the brake pedal operation amount BP, and the steering torque Tra" that change depending on the driving operation of the driver are changed. In this example, the driving support ECU 10 regards a state in which none of "the accelerator pedal operation amount AP, the brake pedal operation amount BP, and the steering torque Tra" are changed and the steering torque Tra remains "0" as a specific state.

The driving support ECU 10 continues the ACC and the LKA after the time point (t1) when the specific state is first detected. At the time point t1, a specific state was detected, but an abnormal state has not yet been detected. In this way, the operation mode in which both the ACC and the LKA are executed without the abnormal state being detected is referred to as a "normal mode". In an initialization routine executed when the ACC and the LKA are started, the operation support ECU 10 sets the operation mode to the normal mode.

First Mode Time Point t2 is a time point at which a first time threshold value Tth1 has elapsed from the time point t1. When the specific state is continued for just the first time threshold value Tth1 from the time t1 when the specific state is first detected, the driving support ECU 10 determines that the driver is in the abnormal state. At t2 when it is determined that the driver is in the abnormal state, the driving support ECU 10 changes the driving mode from the normal mode to the first mode.

In the first mode, the driving support ECU 10 starts a warning processing for the driver. Specifically, the driving support ECU 10 generates a warning sound from the buzzer 71 and displays a warning lamp on the display 72. The operation support ECU 10 continues the ACC and the LKA even after the time point t2.

When the driver notices the above warning processing and restarts the driving operation, one or more of the parameters (AP, BP and Tra) of the driving operator is changed. In this case, the driving support ECU 10 determines that the driver's state has returned from the abnormal state to the normal state. Thus, the driving support ECU 10 changes the driving mode from the first mode to the normal mode. As a result, the driving support ECU 10 ends the warning processing.

Second Mode

The time point t3 is a time point at which a second time threshold value Tth2 has elapsed from the time point t2. When the specific state continues for just the second time threshold value Tth2 from the time t2 when the abnormal state is first detected (that is, at the time point t3), the operation support ECU 10 changes the operation mode from the first mode to the second mode.

In the second mode, the driving support ECU 10 executes a first deceleration control for decelerating the vehicle VA by a first deceleration (negative acceleration) α1 instead of the normal ACC. The driving support ECU 10 continues the LKA.

The driving support ECU 10 continues the warning processing even after the time point t3. The driving support ECU 10 may change the volume and/or generation interval of the warning sound of the buzzer 71 after the time point t3. Further, the driving support ECU 10 may set an audio device (not shown) from an on state to an off state. This makes it easier for the driver to notice the warning sound of the buzzer 71.

Further, the driving support ECU 10 executes a notification processing for other vehicles, pedestrians, etc. around the vehicle VA after the time point t3. Specifically, the driving support ECU 10 outputs a blinking command of the hazard lamp 61 to the meter ECU 60 so as to make the hazard lamp 61 blink.

When the driver notices the above warning processing and restarts the driving operation, the driving support ECU 10 changes the driving mode from the second mode to the normal mode. As a result, the driving support ECU 10 ends the first deceleration control, the warning processing, and the notification processing. Then, as described above, the driving support ECU 10 restarts either the constant speed traveling control or the preceding vehicle following control depending on the presence or absence of the following vehicle.

Third Mode

A time point t4 is a time point at which a third time threshold value Tth3 has elapsed from the time point t3. In this way, when the specific state continues from the time point t3 for just the third time threshold value Tth3 (that is, at the time point t4), the operation support ECU 10 changes the operation mode from the second mode to the third mode.

In the third mode, the driving support ECU 10 executes a second deceleration control for decelerating the vehicle VA by a second deceleration (negative acceleration) α2 instead of the first deceleration control. The driving support ECU 10 continues the LKA. The magnitude (absolute value) of the second deceleration α2 is larger than the magnitude of the first deceleration α1. As a result, the driving support ECU 10 decelerates the vehicle VA and forcibly stops the vehicle VA. The driving support ECU 10 continues the LKA until the vehicle VA stops.

Even after the time point t4, the driving support ECU 10 continues the warning processing and the notification processing. In the notification processing, the driving support ECU 10 executes the following additional processes. The operation support ECU 10 outputs a lighting command for the stop lamp 62 to the meter ECU 60 to light the stop lamp 62. In addition, the driving support ECU 10 outputs a ringing command of the horn 82 to the body ECU 80 to ring the horn 82.

When the driver notices the above warning processing and restarts the driving operation, the driving support ECU 10 changes the driving mode from the third mode to the normal mode. As a result, the driving support ECU 10 ends the second deceleration control, the warning processing, and the notification processing. Then, the driving support ECU 10 restarts either the constant speed traveling control or the preceding vehicle following control depending on the presence or absence of the following target vehicle.

Hereinafter, as described above, "a control to apply braking force to the vehicle VA to stop the vehicle VA (the first deceleration control in the second mode and the second deceleration control in the third mode)" may be collectively referred to as a "stop control".

Fourth Mode

A time point t5 is a time point at which the vehicle VA is stopped by the second deceleration control. At the time point t5, the operation support ECU 10 changes the operation mode from the third mode to a fourth mode. The driving support ECU 10 ends the LKA. Further, the driving support ECU 10 ends the second deceleration control. In addition, the driving support ECU 10 outputs a door lock release command to the body ECU 80, and causes the door lock device 81 to release the door lock.

In the fourth mode, the driving support ECU 10 executes stop holding control. The stop holding control is a control for holding the vehicle VA in a stopped state by continuously applying a braking force to the vehicle VA with the EPB.

The driving support ECU 10 continues the warning processing and the notification processing even after the time point t5. In the notification processing, the driving support ECU 10 ends lighting of the stop lamp 62, and continues only blinking of the hazard lamp 61 and ringing of the horn 82.

Release of Stop Holding Control

As mentioned above, a rescuer may rescue the driver of the vehicle VA after the vehicle VA is stopped. When the rescuer rescues the driver, for example, the driver's foot may touch the accelerator pedal 11a. In the conventional device, there is a possibility that the stop holding control is released and the vehicle VA starts even though the driver is being rescued.

Thus, the driving support ECU 10 repeatedly determines whether the predetermined first condition is satisfied while the stop holding control is being executed. The first condition is satisfied when the accelerator pedal operation amount AP is larger than a predetermined operation amount threshold value APth. In this example, the operation amount threshold value APth is "0". The operation amount threshold value APth may be set to a value that is small enough so that the vehicle VA is not suddenly started.

When the first condition is satisfied, the driving support ECU 10 prohibits the release of the stop holding control. Thus, even if the driver's foot touches the accelerator pedal 11a when the rescuer rescues the driver (even if the first condition is satisfied), the driving support ECU 10 continues the stop holding control without releasing the stop holding control. As a result, it is possible to prevent the vehicle from suddenly starting due to the release of the stop holding control while the driver is being rescued.

The operation support ECU 10 releases the stop holding control only when the first condition is not satisfied and a predetermined release operation is performed. In this example, the release operation is a pressing operation of the LKA switch 18b. The release operation is not limited to this. A button (not shown) for the release operation may be provided near the driver's seat. The release operation may be an operation of pressing the button.

Operation

A CPU of the operation support ECU 10 (hereinafter, simply referred to as a "CPU") executes each of the routines shown in FIGS. 3 to 7 every time a predetermined time dT elapses.

The CPU receives detection signals or output signals from the sensors 11 to 16 and the various switches 18a and 18b each time the predetermined time dT elapses and stores the signals in the RAM.

Figure 3:
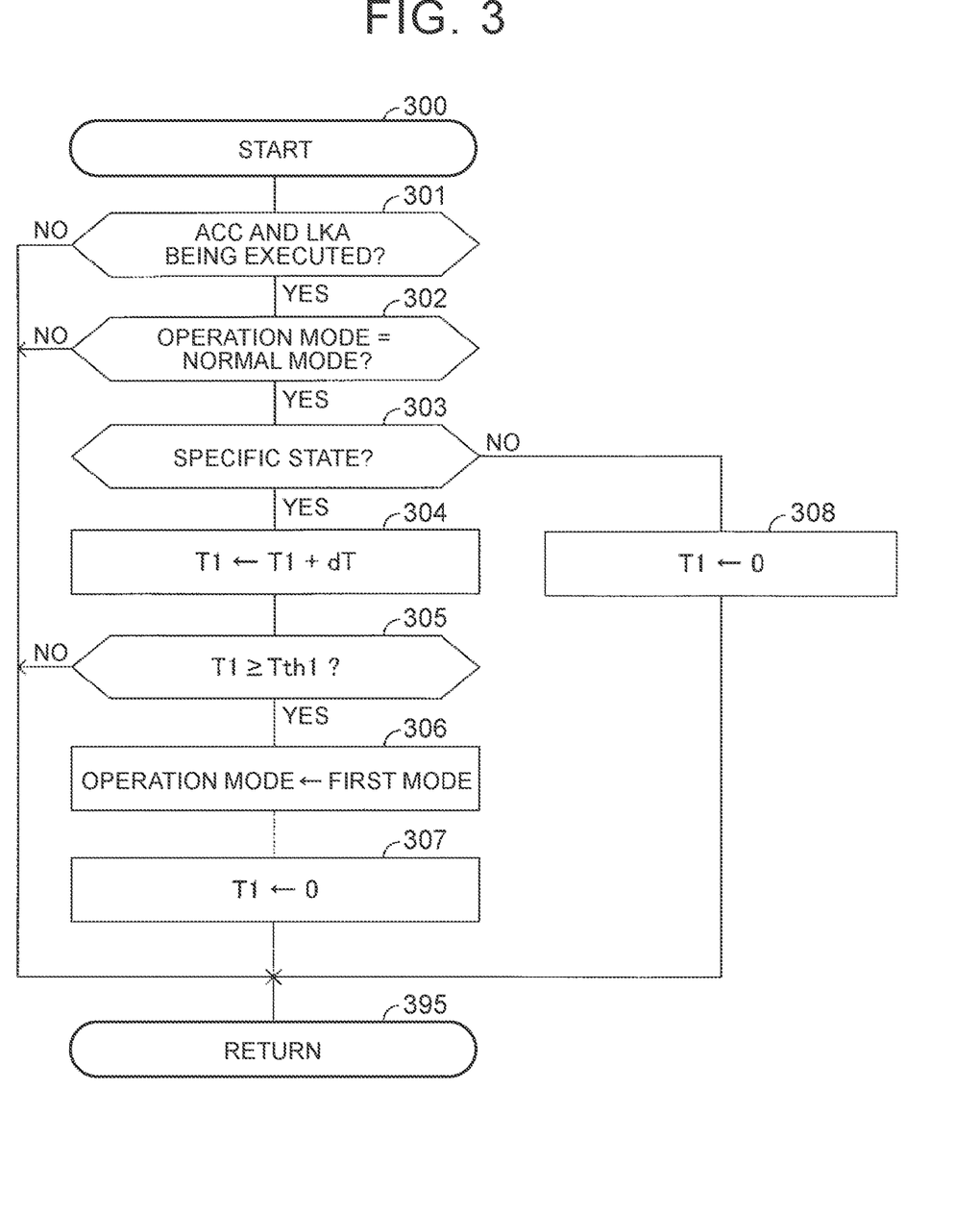
FIG. 3 is a flowchart showing an "abnormal state determination routine" executed by a CPU of an operation support ECU of a first device (hereinafter, simply referred to as a "CPU")

At a predetermined timing, the CPU starts processing from step 300 of the routine in FIG. 3 and proceeds to step 301 to determine whether the ACC and the LKA are currently being executed. If the ACC and the LKA are not executed at this time, it is determined as "No" in step 301, the process directly proceeds to step 395, and this routine is temporarily ended.

When the ACC and the LKA are currently being executed, the CPU determines "Yes" in step 301 and proceeds to step 302 to determine whether the operation mode is the normal mode. If the operation mode is not the normal mode, the CPU determines "No" in step 302, directly proceeds to step 395, and temporarily ends this routine.

Assuming that the ACC and the LKA have just started, the operating mode is the normal mode. In this case, the CPU determines "Yes" in step 302, proceeds to step 303, and determines whether a specific state is detected based on the detection signals of various sensors (11, 12 and 13). As described above, when none of "the accelerator pedal operation amount AP, the brake pedal operation amount BP, and the steering torque Tra" are changed and the steering torque Tra remains "0", the CPU detects the specific state.

When the specific state is detected, the CPU determines "Yes" in step 303, proceeds to step 304, and increases a first duration T1 by the predetermined time dT. The first duration T1 represents the time during which the specific state is continued. As described above, the time dT is the time corresponding to an execution cycle of the routine in FIG. 3. The first duration T1 is set to "0" in the initialization routine described above.

Next, when proceeding to step 305, the CPU determines whether the first duration time T1 is equal to or greater than the first time threshold value Tth1. Assuming that the current time point is a time point immediately after the specific state is first detected, the first duration T1 is smaller than the first time threshold Tth1. The CPU determines "No" in step 305, proceeds to step 395, and temporarily ends this routine.

In contrast, when the first duration T1 becomes equal to or higher than the first time threshold Tth1 because the specific state is continued, the CPU determines "Yes" in step 305, and sequentially performs steps 306 and 307 that are described below. Thereafter, the CPU proceeds to step 395 and temporarily ends this routine.

Step 306: The CPU determines that the driver's state is the abnormal state, and sets the operation mode to the first mode.

Step 307: The CPU resets the first duration T1 to "0".

If the CPU determines "No" in step 303, the CPU proceeds to step 308, resets the first duration T1 to "0", and then directly proceeds to step 395 to temporarily end this routine.

Figure 4:
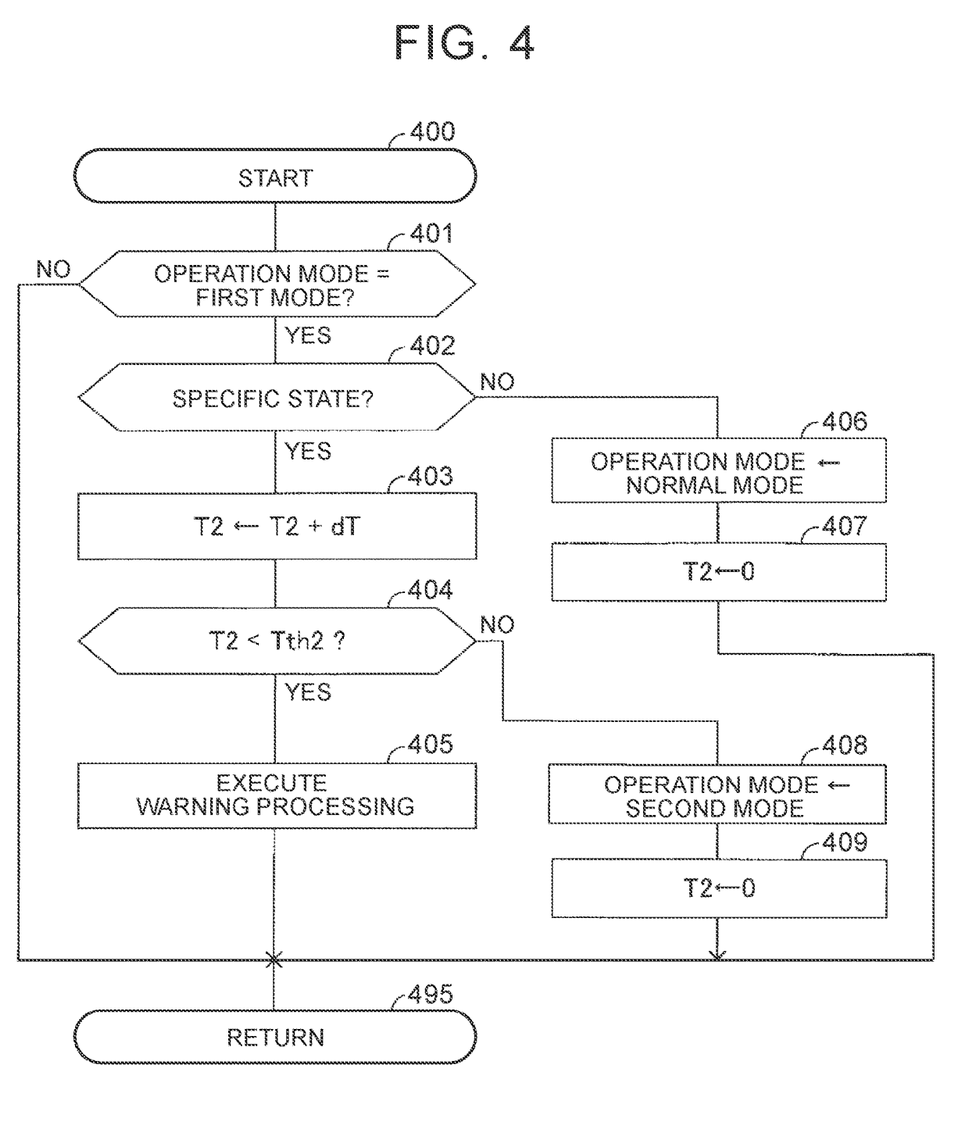
FIG. 4 is a flowchart showing a "first mode control routine" executed by the CPU.

Further, at a predetermined timing, the CPU starts processing from step 400 of the routine in FIG. 4 and proceeds to step 401 to determine whether the operation mode is the first mode. If the operation mode is not the first mode, the CPU determines "No" in step 401, directly proceeds to step 495, and temporarily ends this routine.

In contrast, since it is determined that the driver's state is the abnormal state, it is assumed that the current operation mode is the first mode. In this case, the CPU determines "Yes" in step 401 and proceeds to step 402.

In step 402, the CPU determines whether the specific state has been detected. When the specific state is detected, the CPU determines "Yes" in step 402, proceeds to step 403, and increases a second duration T2 by the time dT. The second duration T2 represents the time during which the specific state is continued from the time when the control of the first mode is shifted (that is, the time when the process of step 306 is executed). In other words, the second duration T2 represents the time during which the abnormal state is continued from the time when the driver is first determined to be in the abnormal state. The second duration T2 is set to "0" in the initialization routine described above.

Next, when proceeding to step 404, the CPU determines whether the second duration T2 is less than the second time threshold Tth2. Immediately after the operation mode shifts to the first mode, the second duration T2 is smaller than the second time threshold Tth2. Thus, the CPU determines "Yes" in step 404, proceeds to step 405, and executes the warning processing as described above. Specifically, the CPU generates a warning sound from the buzzer 71 and displays a warning lamp on the display 72. After that, the CPU proceeds to step 495 and temporarily ends this routine.

Suppose the driver notices the warning processing and resumes driving. In this situation, when the CPU proceeds to step 402, the CPU determines "No" in step 402 and sequentially performs the processes of step 406 and step 407 described below. After that, the CPU proceeds to step 495 and temporarily ends this routine.

Step 406: The CPU sets the operation mode to the normal mode. As a result, since the CPU determines "No" in step 401, the warning processing is ended.

Step 407: The CPU resets the second duration T2 to "0".

In contrast, suppose the second duration T2 becomes equal to or higher than the second time threshold Tth2 because the specific state is continued. In this case, the CPU determines "No" in step 404, and sequentially performs the processes of step 408 and step 409 described below. Thereafter, the CPU proceeds to step 495 and temporarily ends this routine.

Step 408: The CPU sets the operation mode to the second mode.

Step 409: The CPU resets the second duration T2 to "0".

Figure 5:
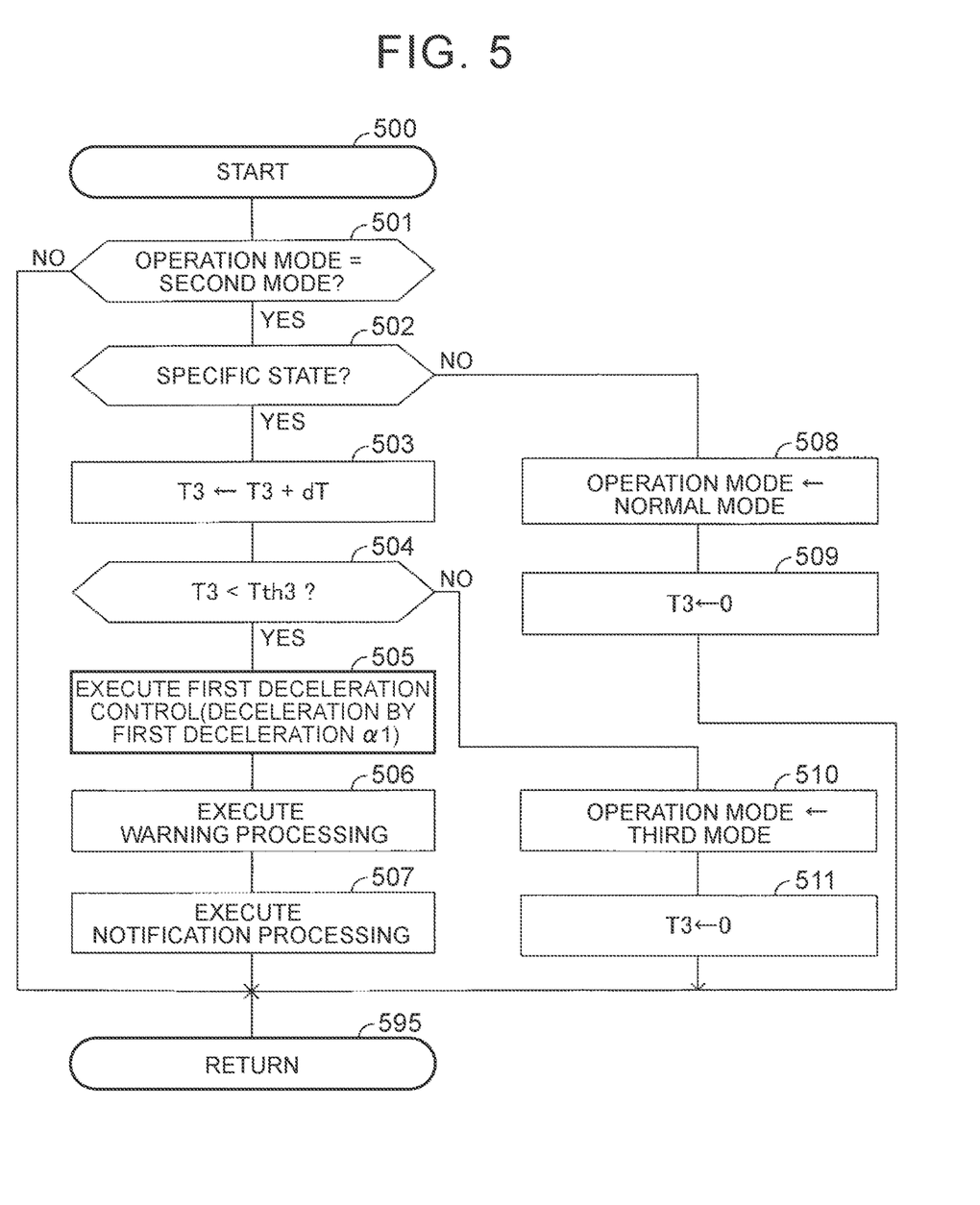
FIG. 5 is a flowchart showing a "second mode control routine" executed by the CPU.

Further, at a predetermined timing, the CPU starts processing from step 500 of the routine in FIG. 5 and proceeds to step 501 to determine whether the operation mode is the second mode. If the operation mode is not the second mode, the CPU determines "No" in step 501, directly proceeds to step 595, and temporarily ends this routine.

In contrast, when the operation mode is the second mode, the CPU determines "Yes" in step 501 and proceeds to step 502 to determine whether the specific state has been detected. When the specific state is detected, the CPU determines "Yes" in step 502, proceeds to step 503, and increases a third duration T3 by the predetermined time dT. The third duration T3 represents the time during which the specific state is continued from the time when the control of the second mode is shifted (that is, the time when the process of step 408 is executed). In other words, the third duration T3 represents the time during which the abnormal state is continued from the time when the control of the second mode is shifted. The third duration T3 is set to "0" in the initialization routine described above.

Next, when the CPU proceeds to step 504, it determines whether the third duration T3 is less than the third time threshold Tth3. Immediately after the operation mode shifts to the second mode, the third duration T3 is smaller than the third time threshold Tth3. Thus, the CPU determines "Yes" in step 504, and sequentially performs the processes of steps 505 to 507 described below. After that, the CPU proceeds to step 595 and temporarily ends this routine.

Step 505: The CPU executes the first deceleration control for decelerating the vehicle VA at the first deceleration α1 instead of the normal ACC.

Step 506: The CPU executes the warning processing as described above. Specifically, the CPU generates a warning sound from the buzzer 71 and displays a warning lamp on the display 72.

Step 507: The CPU executes the notification processing as described above. Specifically, the CPU blinks the hazard lamp 61.

Suppose the driver notices the warning processing and resumes driving. In this situation, when the CPU proceeds to step 502, the CPU determines "No" in the step 502, and sequentially performs the processes of step 508 and step 509 described below. After that, the CPU proceeds to step 595 and temporarily ends this routine.

Step 508: The CPU sets the operation mode to the normal mode. As a result, the CPU determines "No" in step 501, so that the first deceleration control, the warning processing, and the notification processing are ended. Then, the CPU restarts either the constant speed traveling control or the preceding vehicle following control depending on the presence or absence of the following target vehicle.

Step 509: The third duration T3 is reset to "0".

In contrast, suppose the third duration T3 becomes equal to or higher than the third time threshold Tth3 because the specific state is continued. In this case, the CPU determines "No" in step 504, and sequentially performs the processes of step 510 and step 511 described below. After that, the CPU proceeds to step 595 and temporarily ends this routine.

Step 510: The CPU sets the operation mode to the third mode.

Step 511: The third duration T3 is reset to "0".

Figure 6:
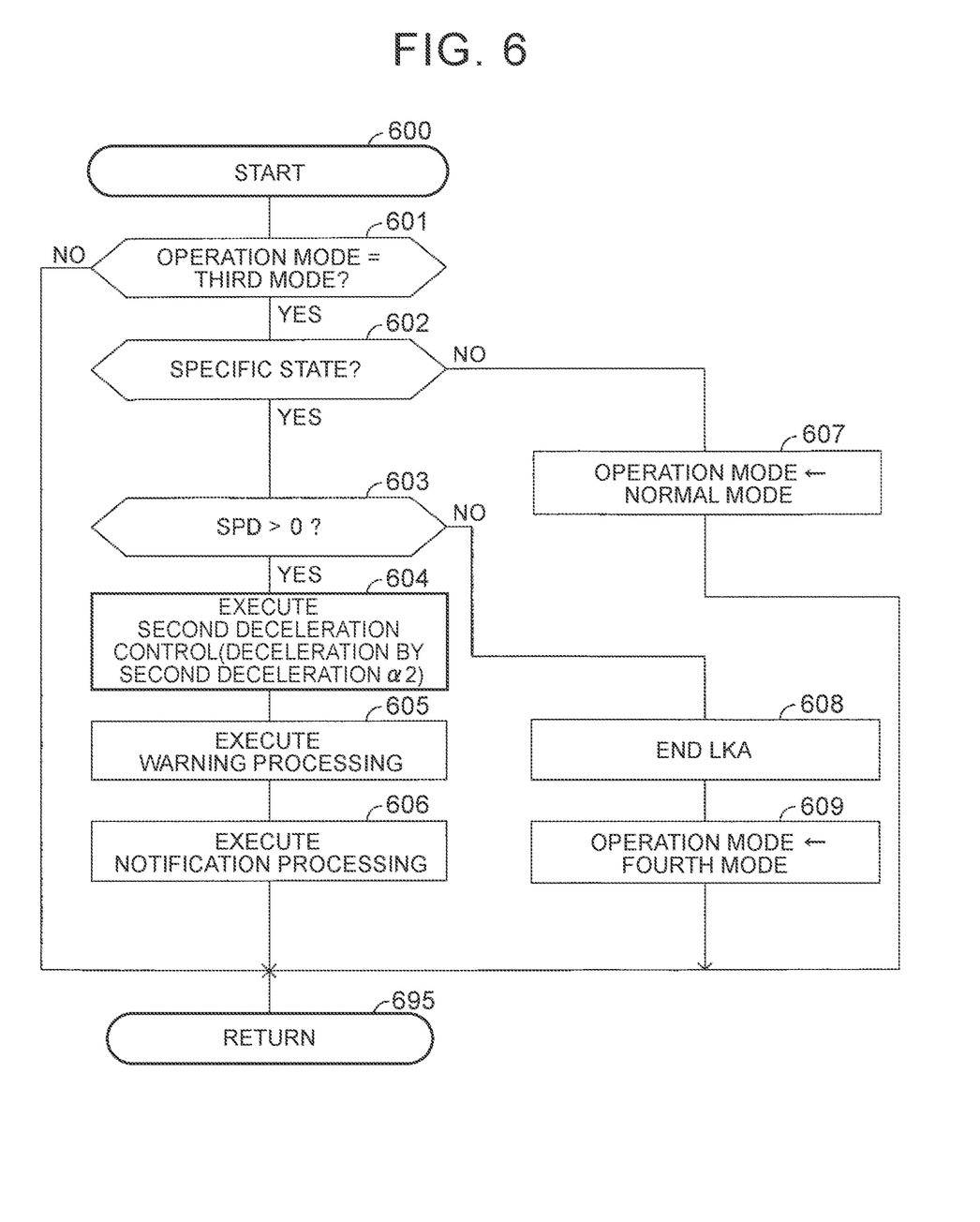
FIG. 6 is a flowchart showing a "third mode control routine" executed by the CPU.

Further, at a predetermined timing, the CPU starts the process from step 600 of the routine in FIG. 6 and proceeds to step 601 to determine whether the operation mode is the third mode. If the operation mode is not the third mode, the CPU determines "No" in step 601 and directly proceeds to step 695 to temporarily end this routine.

In contrast, when the operation mode is the third mode, the CPU determines "Yes" in step 601 and proceeds to step 602 to determine whether the specific state has been detected. When the specific state is detected, the CPU determines "Yes" in step 602, proceeds to step 603, and determines whether the vehicle speed SPD is greater than "0". When the vehicle VA has not stopped yet, the CPU determines "Yes" in step 603, and sequentially performs the processes of steps 604 to 606 described below. After that, the CPU proceeds to step 695 and temporarily ends this routine.

Step 604: The CPU executes the second deceleration control for decelerating the vehicle VA at the second deceleration α2 instead of the first deceleration control.

Step 605: The CPU executes the warning processing as described above.

Step 606: The CPU executes the notification processing as described above. Specifically, the CPU blinks the hazard lamp 61. Further, the CPU turns on the stop lamp 62 and sounds the horn 82.

Suppose the driver notices the warning processing and resumes driving. In this situation, when the CPU proceeds to step 602, the CPU determines "No" in step 602, proceeds to step 607, and sets the operation mode to the normal mode. As a result, since the CPU determines "No" in step 601, the second deceleration control, the warning processing, and the notification processing are ended. Then, the CPU restarts either the constant speed traveling control or the preceding vehicle following control depending on the presence or absence of the following target vehicle.

In contrast, suppose the vehicle VA is stopped by the second deceleration control. In this case, the CPU determines "No" in step 603, and sequentially performs the processes of step 608 and step 609 described below. After that, the CPU proceeds to step 695 and temporarily ends this routine.

Step 608: The CPU terminates the LKA.

Step 609: The CPU sets the operation mode to the fourth mode. At this point, the CPU controls the door lock device 81 to release the door lock of the vehicle VA.

Figure 7:
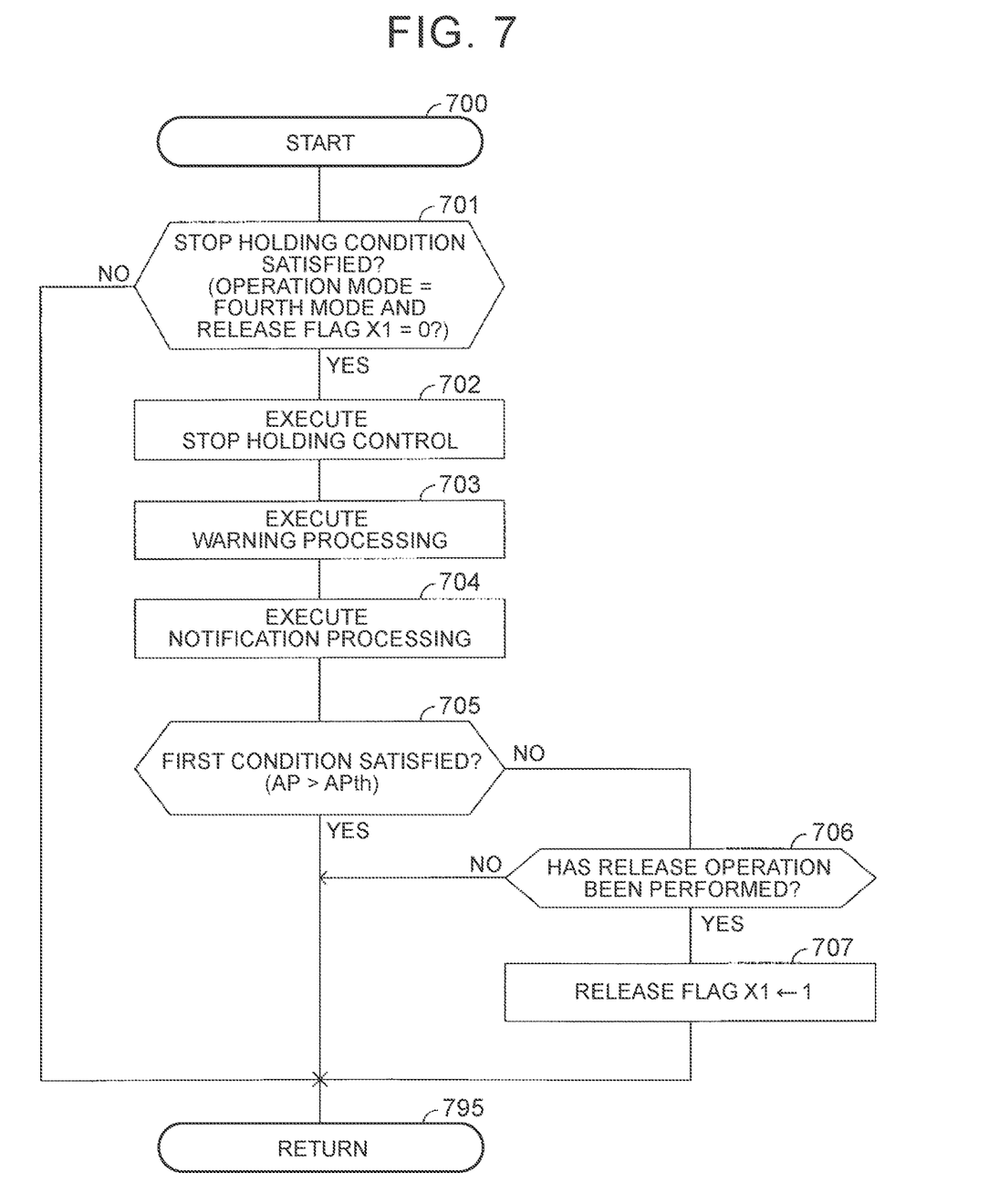
FIG. 7 is a flowchart showing a "fourth mode control routine" executed by the CPU.

Further, at a predetermined timing, the CPU starts the process from step 700 of the routine in FIG. 7 and proceeds to step 701 to determine whether the predetermined stop holding condition is satisfied. The stop holding condition is satisfied when the operation mode is the fourth mode and the value of a release flag X1 is "0". The release flag X1 is a flag indicating whether to release the stop holding control, and is set to "1" when the stop holding control is released/ended, as will be described later. The release flag X1 is set to "0" in the initialization routine described above.

If the stop holding condition is not satisfied, the CPU determines "No" in step 701, proceeds directly to step 795, and temporarily ends this routine.

In contrast, immediately after the operation mode shifts to the fourth mode, the stop holding condition is satisfied. In this case, the CPU determines "Yes" in step 701 and sequentially performs the processes of steps 702 to 704 described below. After that, the CPU proceeds to step 705.

Step 702: The CPU executes the stop holding control as described above.

Step 703: The CPU executes the warning processing as described above.

Step 704: The CPU executes the notification processing as described above. Specifically, the CPU blinks the hazard lamp 61 and sounds the horn 82.

When the CPU proceeds to step 705, the CPU determines whether the first condition is satisfied (that is, whether the accelerator pedal operation amount AP is larger than the operation amount threshold value APth). When the first condition is satisfied, the CPU determines "Yes" in step 705, proceeds directly to step 795, and temporarily ends this routine. In this case, since the value of the release flag X1 is maintained at "0", the stop holding control is continued.

In contrast, if the first condition is not satisfied, the CPU determines "No" in step 705, proceeds to step 706, and determines whether the predetermined release operation has been performed. If the release operation has not been performed, the CPU determines "No" in step 706, proceeds to step 795, and temporarily ends this routine. Since the value of the release flag X1 is maintained at "0", the stop holding control is continued.

In contrast, when the release operation is performed, the CPU determines "Yes" in step 706, proceeds to step 707, and sets the value of the release flag X1 to "1". After that, the CPU proceeds to step 795 and temporarily ends this routine. As a result, the CPU determines "No" in step 701. Thus, the CPU ends the stop holding control and also ends the warning processing and the notification processing.

When the driver wants to restart the ACC and the LKA after the stop holding control is ended, the driver operates the ACC switch 18a and the LKA switch 18b. In response to this operation, the CPU sets the operation mode to the normal mode and restarts the ACC and the LKA.

In the first device having the above configuration, the stop holding control is continued without releasing the stop holding control even when the driver's foot touches the accelerator pedal 11a when the rescuer rescues the driver. Thus, it is possible to reduce the possibility that the vehicle will start while the driver is being rescued.

Further, even when the release operation is mistakenly performed while the driver's foot is touching the accelerator pedal 11a (when the rescuer or the driver's arm touches the LKA switch 18b), the first device can continue the stop holding control without releasing the stop holding control.

Figure 8:
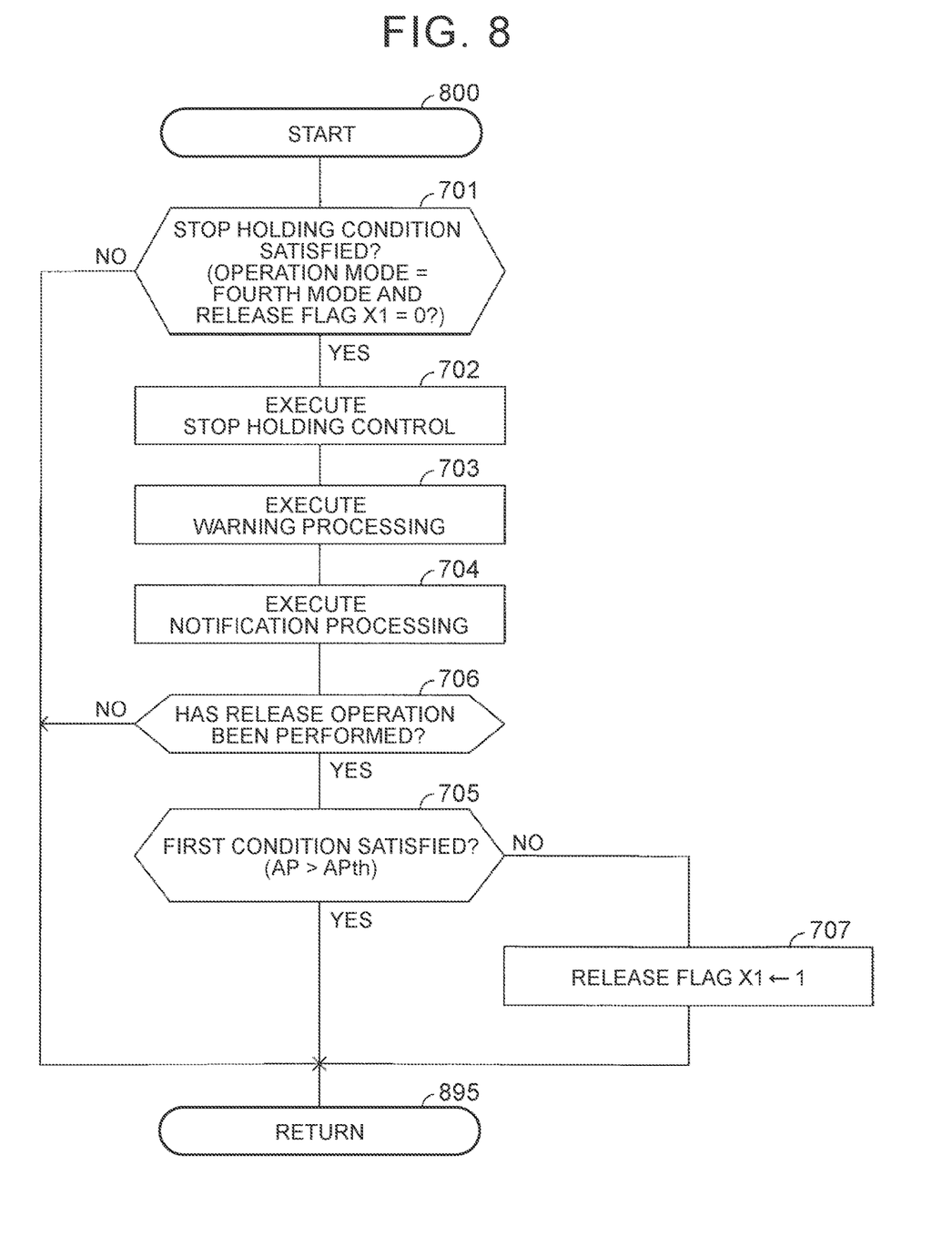
FIG. 8 is a flowchart showing a "fourth mode control routine" according to a modified example of the first device.

The CPU may execute the routine in FIG. 8 instead of the routine in FIG. 7. The routine in FIG. 8 is a routine in which step 706 in FIG. 7 is inserted between steps 704 and 705. In this configuration, in a case in which the release operation is performed when the CPU proceeds to step 706 of the routine in FIG. 8, the CPU determines "Yes" in step 706 and proceeds to step 705, and determines whether the first condition is satisfied. When the first condition is satisfied, the CPU determines "Yes" in step 705, proceeds directly to step 795, and temporarily ends this routine. In this case, since the value of the release flag X1 is maintained at "0", the stop holding control is continued. In this way, the CPU may determine whether the first condition is satisfied when the release operation is performed, and invalidate the release operation when the first condition is satisfied.

Second Embodiment

Next, a vehicle control device (hereinafter, may be referred to as a "second device") according to the second embodiment will be described. The second device differs from the first device in that, in addition to the first condition, it is further determined whether the second condition, which is satisfied when the driver is currently being rescued, is satisfied. Hereinafter, this difference will be mainly described.

Operation

Figure 9:
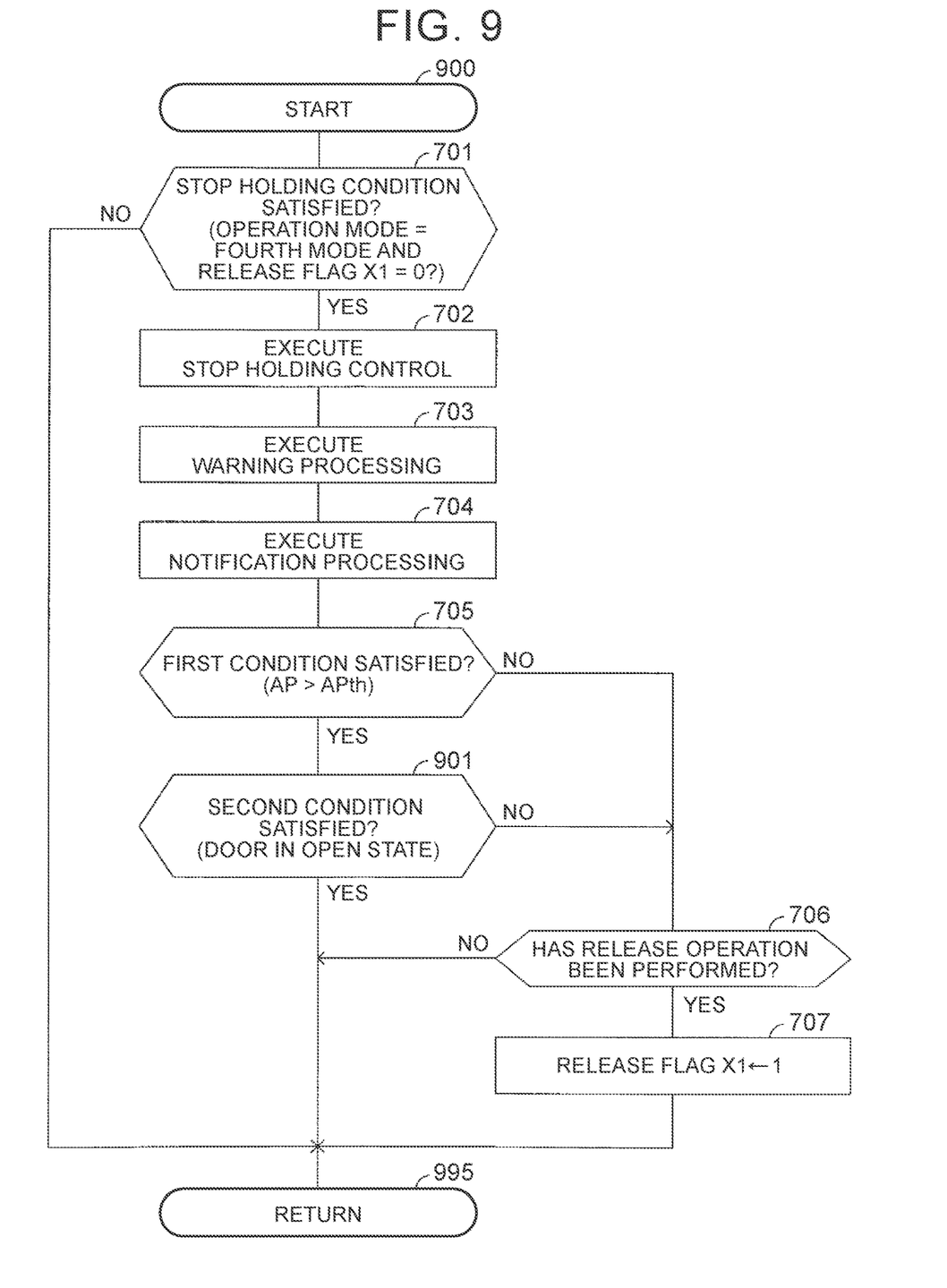
FIG. 9 is a flowchart showing a "fourth mode control routine" executed by a CPU of a vehicle control device (second device) according to a second embodiment.

The CPU of the operation support ECU 10 of the second device executes the routine shown in FIG. 9 instead of the routine shown in FIG. 7. The routine shown in FIG. 9 is a routine in which step 901 is added to the routine shown in FIG. 7. Thus, among the steps shown in FIG. 9, the description of the steps having the same reference numerals as those in FIG. 7 will be omitted.

The CPU starts the processing from step 900 of the routine in FIG. 9. When the CPU determines "Yes" in step 705 and proceeds to step 901, the CPU determines whether the predetermined second condition, which is satisfied when the driver is likely to be currently being rescued, is satisfied. The second condition is satisfied when a door corresponding to a driver's seat is in the open state. The CPU can determine whether the driver's door is open based on the output signal of the door sensor 83.

When the second condition is satisfied, the CPU determines "Yes" in step 901, directly proceeds to step 995, and temporarily ends this routine. In this case, the stop holding control is continued without being released.

In contrast, if the second condition is not satisfied, the CPU determines "No" in step 801 and proceeds to step 706 to determine whether the release operation is performed. When the release operation is performed, the CPU determines "Yes" in step 706 and executes the process of step 707 as described above. Thus, the stop holding control, the warning processing, and the notification processing are ended.

In contrast, when the release operation is not performed, the CPU determines "No" in step 706, proceeds to step 995, and temporarily ends this routine. In this case, the stop holding control is continued without being released.

In the second device having the above configuration, the stop holding control is continued without being released only when it is highly likely that the rescuer is rescuing the driver.

Suppose the driver's condition has returned from the abnormal state to the normal state after the vehicle VA is stopped. At this time, the driver may be touching the accelerator pedal 11a in order to immediately resume traveling of the vehicle VA. In such a situation, even if the driver performs the release operation, the first device continues the stop holding control without releasing the stop holding control. Thus, the driver's intention to resume operation may not be immediately reflected. In contrast, in the second device, even if the driver is touching the accelerator pedal 11a, when the second condition is not satisfied, the driver can release the stop holding control by performing the release operation.

Step 706 may be inserted between steps 704 and 705 in the routine in FIG. 9 as in the routine in FIG. 8. In this case, the CPU determines whether the first condition and the second condition are satisfied at the time point at which the release operation is performed, and invalidates the release operation when the first condition and the second condition are satisfied.

The present disclosure is not limited to the above embodiment, and various modifications can be adopted within the scope of the present disclosure.

The second condition is not limited to the above example. The CPU may determine that the second condition is satisfied when one or both of the following conditions A1 and A2 are satisfied.

Condition A1: The door corresponding to the driver's seat is in the open state.

Condition A2: The driver's seat belt is in the released state. The CPU can determine whether the driver's seat belt sensor 84 is in the released state based on the output signal of the seat belt sensor 84.

For example, the driving support ECU 10 may determine whether the driver is in the abnormal state by using a so-called "driver monitor technology" disclosed in Japanese Unexamined Patent Application Publication No. 2013-152700 (JP2013-152700 A). More specifically, a camera for photographing the driver may be provided on a member (for example, a steering wheel, a pillar, etc.) in a vehicle cabin. The driving support ECU 10 monitors the direction of the driver's line of sight or the direction of the face using the captured image of the camera. The driving support ECU 10 determines that the driver is in the abnormal state when the direction of the driver's line of sight or the direction of the face is continued in a direction other than the front direction. Thus, the time during which the direction of the driver's line of sight or the direction of the face is continuously facing in a direction other than the forward direction is the above-mentioned "the first duration T1", "the second duration T2", and "the third duration T3".

The accelerator operator is not limited to the accelerator pedal 11a, and may be, for example, an accelerator lever. The brake operator is not limited to the brake pedal 12a, and may be, for example, a brake lever.

In the control of the first mode to the fourth mode, the driving support ECU 10 may prohibit the acceleration of the vehicle based on the change of the accelerator pedal operation amount AP. In other words, even when the accelerator pedal 11a is operated while the control of the first mode to the fourth mode is being executed, the driving support ECU 10 may invalidate the acceleration request based on the operation (that is, the request torque to the internal combustion engine 22 is set to zero).

The driving support ECU 10 may continue the preceding vehicle following control of the ACC until the time point at which the control of the fourth mode (stop holding control) is started. In this configuration, the driving support ECU 10 executes the preceding vehicle following control only when the following target vehicle suddenly decelerates. For example, when the following target vehicle suddenly decelerates while the driving support ECU 10 is executing the control of the third mode, the driving support ECU 10 accordingly decelerates the vehicle VA with a deceleration larger than the second deceleration α2.

In the example in FIG. 2, the warning processing may be performed in the period from the time point t1 to the time point t2. For example, when the specific state is continued for the predetermined time (<Tth1) from the time point t1, the operation support ECU 10 may turn on the warning lamp on the display 72 until the operation mode shifts to the first mode. This warning lamp may be a message or mark that "prompts the holding of the steering wheel SW".

What is claimed is:

1. A vehicle control device comprising:
a sensor that acquires information about an operation amount of a driving operator operated by a driver of a vehicle to drive the vehicle, the driving operator at least including an accelerator operator operated to accelerate the vehicle; and
a control device that is configured to
repeatedly determine whether the driver is in an abnormal state in which the driver has lost an ability to drive the vehicle while the vehicle is traveling, based on the information about the operation amount of the driving operator,
execute a stop control of applying a braking force to the vehicle to stop the vehicle, when a determination that the driver is in the abnormal state is continued, and
execute a stop holding control of holding the vehicle in a stopped state by continuously applying the braking force to the vehicle after the vehicle is stopped by the stop control, wherein
the control device is configured to:
determine whether a first condition is satisfied, wherein the first condition is satisfied when the operation amount of the accelerator operator is larger than a predetermined threshold value, while the stop holding control is being executed;
determine whether a second condition is satisfied, wherein the second condition is satisfied when a probability is high that the driver is currently being rescued, while the stop holding control is being executed;
prohibit the stop holding control from being released, when both (i) the first condition is satisfied and (ii) the second condition is satisfied;
when either one of the first condition is not satisfied or the second condition is not satisfied, determine whether a predetermined release operation for releasing the stop holding control is being performed;
release the stop holding control, when the following conditions are met: (i) the first condition is satisfied, and (ii) the second condition is not satisfied, and (iii) the predetermined release operation is being performed, while the stop holding control is being executed; and
release the stop holding control, when the following conditions are met: (i) the first condition is not satisfied, and (ii) the second condition is not satisfied, and (iii) the predetermined release operation is being performed, while the stop holding control is being executed.

2. The vehicle control device according to claim 1, wherein the control device is configured to determine that the second condition is satisfied, when at least one of the following is satisfied: aa condition that a door corresponding to a seat of the driver is open, or (ii) a condition that a seat belt of the seat of the driver is in a released state.

* * * * *